United States Patent [19]

Speckenbach

[11] Patent Number: 4,885,758
[45] Date of Patent: Dec. 5, 1989

[54] SPEED CORRECTION AND STOP BIT CONTROL CIRCUIT FOR DATA COMMUNICATIONS DEVICE

[75] Inventor: Stephen J. Speckenbach, Oakland, Calif.

[73] Assignee: Hayes Microcomputer Products, Inc., Horcross, Ga.

[21] Appl. No.: 203,229

[22] Filed: Jun. 6, 1988

[51] Int. Cl.$^4$ .............................................. H04L 7/02
[52] U.S. Cl. ..................................... 375/118; 375/112
[58] Field of Search ................ 375/118, 112; 370/102; 377/72, 76-78, 81; 365/189, 221

[56] References Cited

U.S. PATENT DOCUMENTS

| | | | |
|---|---|---|---|
| 3,940,736 | 2/1976 | Inaba et al. | 375/112 |
| 4,210,777 | 7/1980 | Bowerman et al. | 375/117 |
| 4,224,473 | 9/1980 | Kaul et al. | 370/102 |
| 4,700,358 | 10/1987 | Duncanson et al. | 375/8 |
| 4,731,646 | 3/1988 | Kliem | 370/102 |

Primary Examiner—Robert L. Griffin
Assistant Examiner—Marianne Huseman
Attorney, Agent, or Firm—Jones, Askew & Lunsford

[57] ABSTRACT

A speed correction circuit for use in a modem implementing a data communications protocol having tighter tolerances on bit timing for the transmitted data than for the input data. Selective insertion and deletion of stop bits is used to compensate for overspeed or underspeed conditions between the input and the transmitted data streams. The apparatus loads the incoming data into a FIFO register of predetermined length. Counters in a clock circuit keep track of character timing. Just before transmission of a stop bit, predetermined positions in the FIFO are tested to see if they are occupied in order to detect an overspeed or underspeed condition. If no overspeed or underspeed is detected the top bit is transmitted in its normal fashion. If underspeed is detected, a transmit controller sends a stop bit, and shifting out of the last bit in the FIFO is suppressed for one bit time. This inserts a stop bit in the data stream while allowing additional bits to come into the FIFO. If overspeed is detected, the stop bit then present at the output of the FIFO is shifted out prior to the transmit controller being clocked to send out the bit then present on the FIFO output. This shifts out the stop bit and allows the first bit from the next character to ripple through to the output prior to clocking of the transmit controller, thus deleting a stop bit from the transmitted data stream to correct the overspeed condition.

6 Claims, 4 Drawing Sheets

SPEED CORRECTION AND STOP BIT CONTROL CIRCUIT FOR DATA COMMUNICATIONS DEVICE

TECHNICAL FIELD

The present invention relates to digital data communications and in particular is an improved apparatus for providing an output digital bit stream with bit times of a predetermined tolerance in response to an incoming digital bit stream having bit times which can err by a greater tolerance, and for selectively inserting and deleting stop bits to compensate for any differences.

BACKGROUND OF THE INVENTION

In modern data communications devices, including modems, there are often specified timing requirements with respect to bit and character times encountered at various points in the data transmission path. In conventional arrangements for communicating by modem, an asynchronous serial port on data terminal equipment provides a connection to a matching port on data communications equipment, such as a modem. In such devices, bit timing information is conventionally carried in the data itself, i.e., there is no separate clock signal provided from the data terminal equipment to the data communications equipment in order to synchronize one to the other. In some data communications protocols, the data rate over the DCE to DCE link, typically between two modems over a telephone line, is effectively slaved to the data rate of the serial port at the sending station.

Certain communications protocols require very precise bit and data rates between modems. This is normally specified as a bit time or a bit rate plus or minus specified tolerances. In recognition of the reality of the installed base of data terminal equipment and the practical requirements for other protocols, such protocols will specify that the data communications equipment must be able to handle incoming data at the specified bit time or data rate, plus or minus a second set of tolerances, which are less stringent than the first set. An example is CCITT Recommendation V.32. As is known to those skilled in the art, Recommendation V.32 specifies a full duplex 9600 bit per second communications protocol which can be implemented over voice grade telephone lines. A quick check of elementary information and noise theory will quickly lead to the conclusion that same cannot be done within the bandwidth of typical telephone lines. However, as is known to those skilled in the art, V.32 modems employ elaborate echo cancelling systems which allow each modem to subtract from the signal present on the phone line its own contribution, and thus to detect the transmitted signal from the other end. This is the data communications equivalent of two people standing face to face and shouting as loudly as they can, while trying to make some arrangement for tuning out what they are saying in order to hear the other person.

Be that as it may, it is well known to those skilled in the art that bit timing is critical on a V.32 link. The Recommendation employs a dense 16 point constellation and encodes four bits per baud time. The use of trellis coding asists in error correction. However, any appreciable phase jitter in the link will cause the communication scheme to break down.

Therefore, CCITT Recommendation V.32 specifies that the transmission speed shall be 9600 bits per second plus or minus 0.01 percent. Again, in recognition of the reality of conventional asynchronous communications adaptors and other serial devices, the protocol specifies that the modem must be able to handle incoming data from the data terminal equipment at 9600 bits per second with tolerances up to minus 2.5 percent and plus 1.0 percent.

This, naturally, leads to a requirement that something be done to compensate for any differences between the input bit rate and the modem to modem V.32 link bit rate. The conventional, well accepted approach to same is deletion of stop bits in response to an overspeed condition, i.e., one in which the incoming data rate is faster than the modem to modem data rate. Conversely, extra stop bits are inserted in response to an underspeed condition. Various schemes have been known in the prior art for accomplishing this and the function is therefore not, per se, novel.

The inventor of the present invention is unaware of the details of implementation of this function on a number of prior art devices. However, tests on prior art modems, and modems manufactured by competitors of the inventors assignee have indicated a certain lack of stability with respect to implementation of this function. In particular, several prior art V.32 modems will dependably operate to insert and delete stop bits in response to relatively constant underspeed and overspeed conditions. However, the inventor of the present invention has discovered an instability and breakdown in the prior art schemes when there is a significant jitter in the bit timing on the incoming data signal, centered around the nominal value of 9600 bits per second.

In other words, if the serial port is performing rather poorly, in that it maintains a relatively constant underspeed or overspeed condition, the prior art speed correction circuits will dependably handle these circumstances. However, if the serial port is operating very close to the nominal speed of 9600 bits per second, but there are intermittent changes to bit times corresponding to a rate slightly higher than 9600 bits per second, and subsequent ones corresponding to data rates slightly lower than 9600 bits per second, the circuits will fail to operate properly and communication link will be lost. This leads to the need to terminate communications and normally causes the modems to go through a rather lengthy retraining sequence with respect to the echo cancellers.

U.S. Pat. No. 4,210,770 to Bowerman et al. entitled Pseudo-Transparent Stop Bit Generator addresses a somewhat analogous problem and generates variable length stop bits using asynchronous devices such as one shots and the like. However, in V.32 modems, it is important that entire, properly timed, stop bits be inserted or deleted in order to correct for underspeed or overspeed conditions. Therefore, there is a need in the art for a highly stable speed correction circuit, particularly one which is useful in a modem implementing CCITT Recommendation V.32, which will dependably compensate for overspeed or underspeed conditions from the data terminal equipment in the presence of significant timing jitter in the data input signal, even when such jitter causes the bit times to err in opposite senses with respect to the nominal bit time.

SUMMARY OF THE PRESENT INVENTION

Broadly stated, the present invention meets the above stated need of the prior art by providing a first in, first out (FIFO) register for buffering a predetermined number of bits of the incoming data stream. A clock generates a synchronous data clock signal for controlling the critical bit timing on the modem to modem link, i.e., the timing within the more stringent tolerances for bit time. The clock also generates an asynchronous terminal count clock signal indicating the end of a character in response to signals specifying the particular character format being employed at the time communication is proceeding. Additionally, an asynchronous clock generator is provided which provides an asynchronous clock signal in response to one signal from the main clock and the incoming data, which asynchronous clock signal is used to clock data into the FIFO register.

Shift control apparatus controls the shifting out of data from the register to a transmit control device The transmit control device clocks data out at the synchronous bit clock rate. In response to detection of an overspeed condition, a shift out signal is provided to the FIFO register slightly advanced with respect to the time the next shft signal would normally occur during normal shift out of the next bit. No attempt is made to detect the overspeed condition until the appropriate constant state of the asynchronous terminal count clock is reached indicating that a stop bit should be present at the output of the FIFO since the end of a character has been reached. With the shifting out of this stop bit, the stop bit simply does not make it through the transmit control device since, by the time the next occurrence of the appropriate edge of the synchronous bit timing clock occurs, the next subsequent bit (the start bit for the next character) will be present on the output of the FIFO. Thus, in response to an overspeed condition, stop bits which have rippled through to the data output of the FIFO are simply shifted out into oblivion, and never make it to the transmitted data output stream.

In response to an underspeed condition the shift out signal is suppressed at the end of a character and thus the stop bit present in the FIFO is not shifted out. The underspeed signal forces the transmit control device to a logical condition mimicking a stop bit for another period of the synchronous bit clock. At the end of this synchronous bit clock period, the shift out signal from the FIFO will occur normally and the stop bit at the data output of the FIFO will be shifted out in a normal fashion. In the meantime, data is being clocked into the FIFO in response to the asynchronous clock signal in its normal manner.

Important aspects of preferred forms of the present invention are that all signals are synchronized and deglitched to clock signals within the system, including multiple rate clock signals from the master clock of the apparatus. Multiple rate clock signals refers to signals having integer multiple relationships of the frequencies of the main bit and character timing signals in the circuit. A critical aspect of the present invention is that no adjustment is made unless an asynchronous terminal count signal is provided indicating that a stop bit from a character has rippled through to the outputs of the FIFO. When this occurs, testing for overspeed or underspeed conditions occur at appropriate times around the next active edge of the synchronous bit clock which times the transmitted data output stream. An overspeed condition is detected in a look ahead manner in that a test is made for the overspeed condition prior to the occurrence of the next active edge of the synchronous bit clock. If the overspeed condition is detected, the stop bit in the FIFO is shifted out of the FIFO, but the transmit controller never allows same to pass through it to the transmitted bit stream.

When the underspeed condition is detected, shifting out of the stop bit in the FIFO is suppressed for one bit time and a stop bit is inserted in the data stream by forcing the transmit controller to a state corresponding to the stop bit, normally logical.

Since data is being loaded asynchronously at the input end of the FIFO, it will be readily appreciated that the apparatus is virtually immune to very large fluctuations (within the specified tolerances) of the input bit timing since it only detects off speed conditions when it is prepared to transmit a stop bit from a character which has made it through the FIFO.

In the preferred embodiment, overspeed and underspeed conditions are detected by testing for the presence of data bits at particular locations within the FIFO. If there is no data bit at a downstream location near the output (bit 4 out of 7 bits in the preferred embodiment) then an underspeed condition is detected, and the apparatus responds as described above. This, naturally, corresponds to the fact that data is not being loaded into the FIFO fast enough to sustain a constant stream of real data bits in the transmitted data output stream.

The overspeed condition is detected by testing for the presence of a bit at a bit position near the FIFO's input. When it is found that this bit position is loaded, it will be apparent that the FIFO is filling too quickly and, if no stop bit is thrown away, the FIFO will overrun leading to a loss of data.

Therefore, it will be understood that it is an object of the present invention to provide an improved speed correction circuit for a data communications device which must accept an incoming bit stream at a predetermined bit rate plus or minus a first set of tolerances and must provide an output bit stream at the same predetermined bit rate plus or minus a second, more stringent, set of tolerances.

It is also an object of the present invention to provide an improved data speed correction apparatus which will operate dependably even in the presence of significant bit timing jitter and when such bit timing jitter occurs around the nominal bit time value.

It is also an object of the present invention to provide an improved speed correction circuit particularly suitable for use in a modem implementing CCITT Recommendation V.32 and to provide such a circuit which may be readily implemented in gate array technology currently available.

That the present invention accomplishes the objects, and overcomes the drawbacks of the prior art cited hereinabove will become apparent from the detailed description of the preferred embodiment below.

BRIEF DESCRIPTION OF THE DRAWINGS

FIG. 3, which is split into

DETAILED DESCRIPTION

Figure 1:
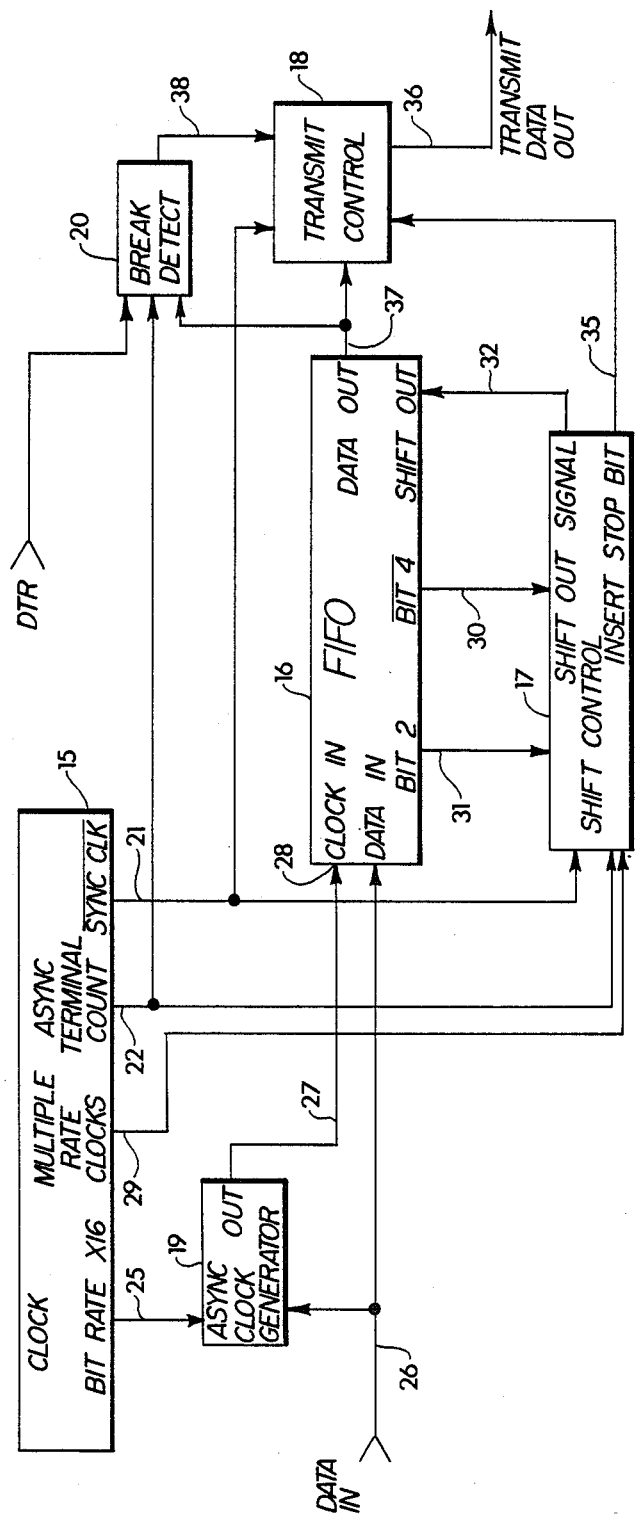
FIG. 1 is a block diagram of the preferred embodiment of the present invention.

Turning next to the drawing figures in which like numerals represent like parts, the preferred embodiment of the present invention will now be described. First, it should be noted that it is an object of the present invention to provide an improved speed correction and stop bit insertion/deletion circuit which may be readily implemented in gate array logic. Therefore, the preferred embodiment was designed, and is disclosed herein, using standard TTL parts. However, the inventor of the present invention believes that the best mode of practicing the present invention is to make the straightforward transformation from the disclosed and designed embodiment using standard TTL devices to gate array logic so that the present invention will ultimately be embodied in a custom gate array chip.

Turning first to FIG. 1, a block diagram of the preferred embodiment is shown. The main building blocks of the preferred embodiment are clock circuit 15, FIFO 16, shift controller 17, and transmit controller 18. The other blocks shown on FIG. 1 are asynchronous clock generator 19 and break detector 20. Turning first to clock circuit 15, a master crystal oscillator (not shown in FIG. 1) provides a master clock signal. From this is derived an output bit timing clock referred to as the signal SYNC CLK which appears on line 21. An asynchronous terminal count, or end of character signal, is provided on line 22 and is referred to throughout this specification as signal ASTC.

One of the multiple rate clock signals provided by clock 15 is the signal on line 25 at 16 times the bit rate. This is provided to asynchronous clock generator 19 which logically combines this signal with incoming data on line 26 to produce the asynchronous clock output signal on line 27. The signal on line 27 is provided to the clock in or shift in input 28 on FIFO 16 and shifts data from line 26 into FIFO 16. A plurality of multiple rate clock signals are indicated as being provided on line 29 from clock 15. The multiple rate signals are a plurality of integer multiples of various timing signals provided from clock circuit 15 and are not called out in great detail, since their generation by the use of counters as dividers is well known to those skilled in the art. Particular multiple rate clock signals are called out, when used, in the more detailed drawings of FIGS. 2 and 3 of this disclosure.

Two bit position detect signals are provided on lines 30 and 31 from FIFO 16. The signal on line 30 is active when no bit is present at bit position 4 of FIFO 16. It should be understood that, in the preferred embodiment, FIFO 16 is 7 bits deep and 1 bit wide. This specification adopts the convention of number bit positions from 1 to 7 with bit 1 being the input stage of the FIFO and bit 7 being the output.

The signal on line 32 is active when a bit is present at bit position 2, indicating that the FIFO is almost full. The bit position signals on lines 30 and 31 are provided as inputs to shift controller 17 which has as its other inputs the SYNC CLK signal on line 21, the asynchronous terminal count (end of character) signal on line 22, and some of the multiple rate clock signals from line 29.

The outputs from shift controller 17 are the shift out signal which appears on line 32 and the stop bit insert signal which appears on line 35. The stop bit insert signal is provided to transmit controller 18 and, when a pulse appears on this line, transmit controller 18 responds to provide an inserted stop bit on transmitted data output line 36 for the next cycle of the SYNC CLK signal on line 21.

When no underspeed condition is detected, transmit controller 18 will normally transmit out on line 36 the data appearing on line 37 from the output stage (bit 7) of FIFO 16. As noted hereinabove, when an overspeed condition is detected, an extra shift out signal is provided on line 32 and thus a stop bit which will then be present (as will be clear from the description hereinbelow) on line 37 will be lost, since same will not be clocked out on to line 36 by transmit controller 18.

Break detector 20 serves to detect a break signal condition and provide an appropriate output on line 38 to hold the output on line 36 low in order to transmit a replication of the break signal.

Figure 2:
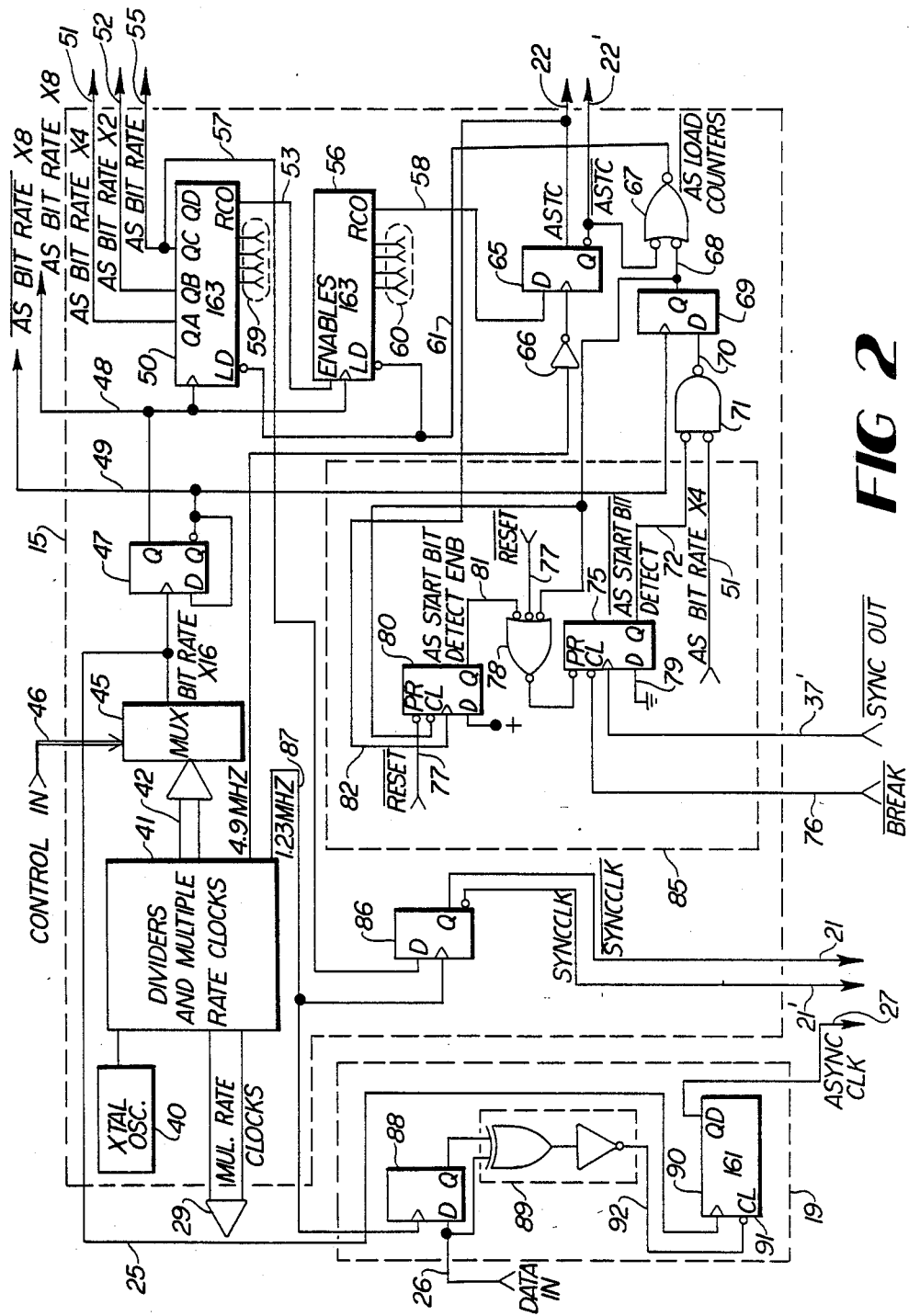
FIG. 2 is a schematic diagram of the clock and the asynchronous clock generator of the preferred embodiment.
Figure 3A:
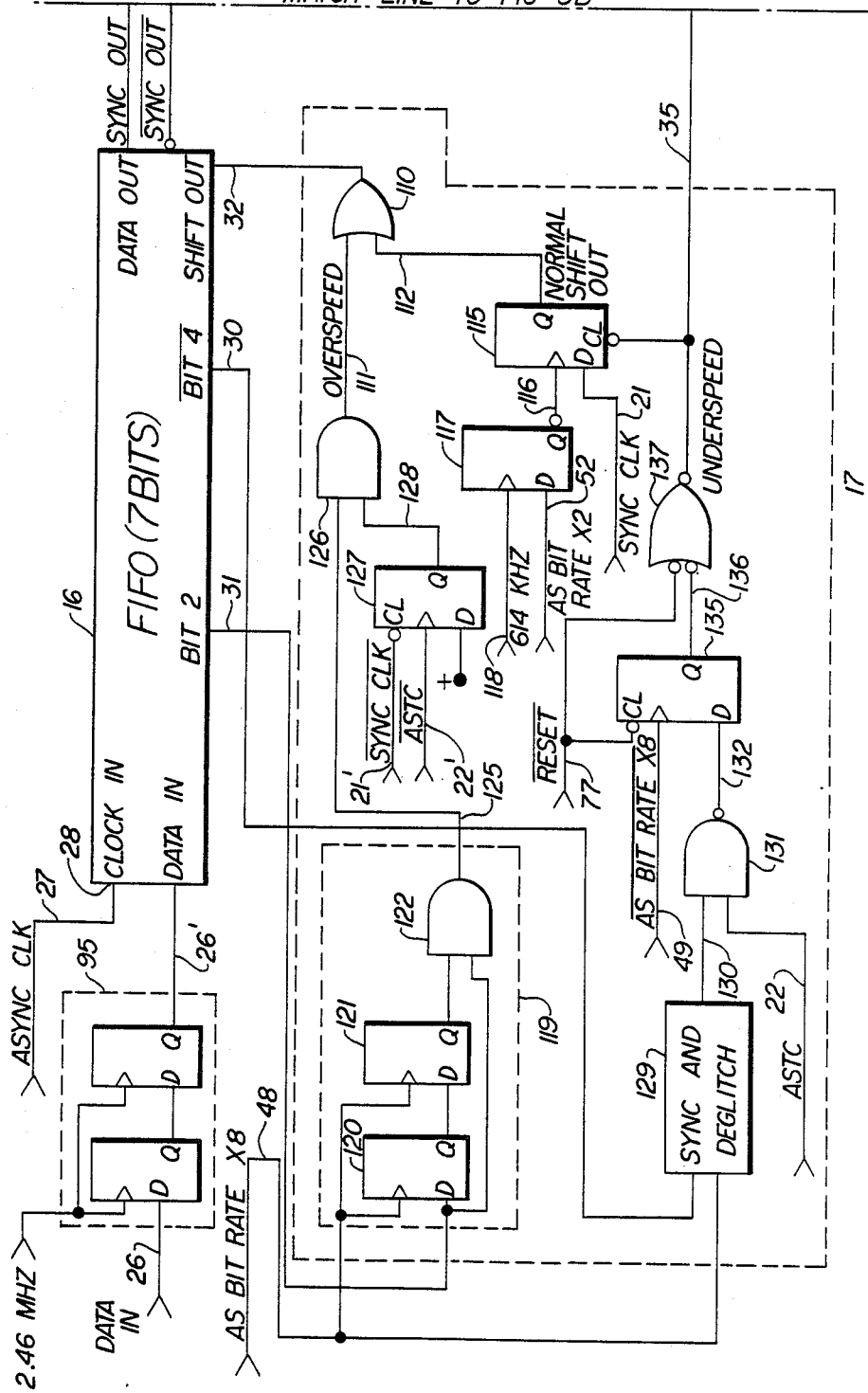
FIGS. 3A and 3B, is a schematic diagram of the shift controller, transmit controller, and break detector of the preferred embodiment.
Figure 3B:
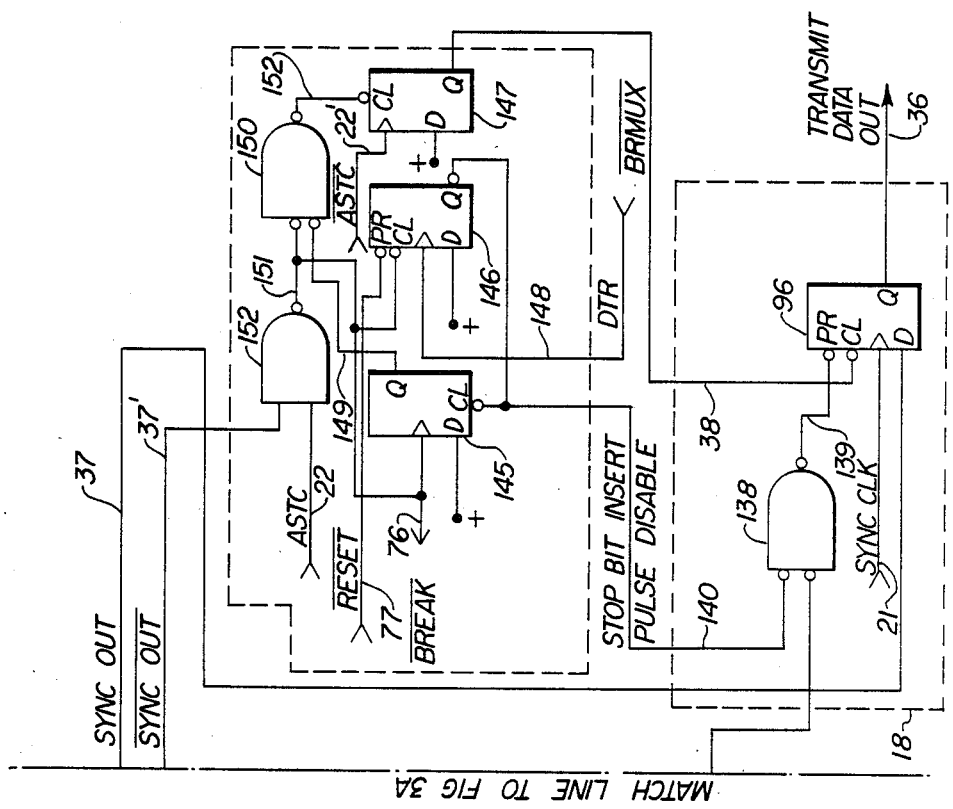

Turning next to FIGS. 2 and 3, detailed schematics of the elements shown in block form on FIG. 1 are shown. It should first be noted that reference numerals from FIG. 1 are duplicated throughout the remaining figures. It should also be noted that certain signals, particularly those provided from clock 15, are shown as appearing on lines with schematic notation indicating the presence of a plug. This is simply a convention adopted for the present disclosure to simplify the drawing since there is no particular utility in duplicating a plurality of lines carrying clock signals. All of the lines bearing the same signal label are electrically identical. Thus, the origin of the signal may be traced to the line upon which the signal name first appears and any other line shown as a plug input to another device, bearing the same signal name, will be understood to simply be connected to that signal line through conductors which are not shown in the drawings.

With that in mind, turn next to FIG. 2 which shows a detailed schematic of clock 15 and asynchronous clock generator 19. Details of clock 15 and asynchronous clock generator 19 are shown in FIG. 2. In FIG. 2, the elements comprising clock 15 are surrounded by dashed line 15 and, similarly, the elements comprising asynchronous clock generator 19 are likewise surrounded by a dashed line referenced with that number. The main timing source of clock 15 is a prcision crystal oscillator 40 shown in the upper left hand corner of FIG. 2. The output from this oscillator is provided to a block labeled dividers and multiple rate clocks. A block diagram is chosen here simply to represent that a plurality of clock signals at submultiples of the frequency of crystal oscillator 40 are provided in a typical divider chain known to those skilled in the art. A collection of lines indicated as 29 corresponds to line 29 shown on FIG. 1, and is indicated as exiting clock 15. This merely represents the availability of various ones of the multiple rate clock signals that are used in the preferred embodiment. The term multiple rate is chosen to describe these clock signals since their frequencies are integer multiples of other clock frequencies used in the system, which are more intimately tied to the bit and byte timing.

Another collection of lines shown as 42 is provided to a multiplexer 45 having control inputs represented by external input lines 46. This represents the control of the data rate via an externally applied signals through lines 46. The preferred embodiment of the present invention is usable to communicate in a plurality of data communication speeds including 1200, 2400, 4800, and 9600 bits per second. While the preferred embodiment is described in connection with 9600 bit per second communications in a V.32 modem, it will be radily appreciated that it operates at other data communication speeds. It will also be appreciated that commercially practical embodiments of higher speed modems often require the ability to communicate at lower speeds, for increased data communications compatibility.

For the balance of this specification, assume that the signals on control input lines 46 select a signal from lines 42 to pass through multiplexer 45 such that the machine is operating at 9600 bits per second.

The output of multiplexer 45 appears on line 25 (also shown in FIG. 1) and is a signal labeled BITRATE X 16 which indicates that this is a precision clock signal at 16 times the selected bit rate. In the operating example of the preferred embodiment described herein, this signal will have a frequency of 153.6 kiloHertz. The BITRATE X 16 signal is provided as the clock input to a toggle flip-flop 47, the outputs of which appear as asserted and negated forms of the clock signal ASBITRATE X 8 on lines 48 and 49, respectively. The output from line 48 is further divided by a type 163 counter 50 to provide two multiple rate clock signals on lines 51 and 52, and to finally arrive at the signal ASBITRATE on line 55.

From the foregoing, it will be appreciated that flip-flop 47 marks the line of demarcation between the upstream clock signals and the asynchronous bit rate signals on lines 48, 49, 51, 52, and 55. All of the ASBITRATE signals are clocked from the ASBITRATE X 8 signal on line 48 and are thus all synchronously generated.

Further dividing of the bit rate signal is accomplished by cascading character bit counter 56 to divider counter 50 in a conventional fashion. The output from the ripple carry output (RCO) of counter 50 is provided on line 53 to the enable inputs of a type 163 counter 56. Counter 56 is also clocked by the ASBITRATE X 8 signal on line 48. The only output used by the system from counter 56 is the ripple carry output which appears on line 58. Those skilled in the art will recognize that the ripple carry output goes high when counters 50 and 56 reach their full counts.

Counters 50 and 56 are both embodied by 163 type counters which have synchronous parallel loading inputs which appear on collections of lines shown as 59 and 60, respectively. Loading from parallel inputs 59 and 60 is controlled by a load signal on line 61 labeled as negated ASLOAD COUNTERS.

When the signal on line 61 goes low (active) counters 50 and 56 will load data from ports 59 and 60, respectively, on the next rising edge of the signal on line 48. Ports 59 and 60 are connected to outputs of a multiplexer (not shown) which is externally driven to select parallel load inputs as a function of the character format then in use by the modem of which the preferred embodiment forms a part. The preferred embodiment is usable with character formats having one start bit and one stop bit, and a number of data bits in the range from 6 to 9. Therefore, the total character size falls in the range of 8 to 11. Appropriate inputs are provided on ports 59 and 60 to match the character format selected. In the preferred embodiment, the first bit position is always loaded to a 1 when a parallel load takes place. Therefore, counter 50 will begin its count at an odd number, rather than ever starting from zero.

Irrespective of the format selected, the signal on line 58 will go high when counters 50 and 56 count to their terminal count indicating that the last bit of the current character has been reached. The signal on line 58 is provided as an input to a flip-flop 65 which is clocked by a 4.9152 megaHertz signal from divider chain 41, which signal is inverted by inverter 66. Unless otherwise noted, all of the flip-flops shown on the drawing are embodied as type 74 LS 74 D type flip-flops which have positive edge triggered clock inputs and asynchronous direct preset (PR) and clear (CL) inputs. The outputs of flip-flop 65 appear as asserted and negated forms of the signal ASTC (Asynchronous Terminal Count) on lines 22 and 22', respectively. Thus, it should be understood that signal ASTC indicates that the end of an entire character has been counted by the counter chain consisting of counters 50 and 56. It should also be noted that transitions on the ASTC signal lines are delayed slightly (approximately 0.1 microsecond) and synchronously, with respect to the clock signals on line 48.

The counter load signal, negated ASLOAD COUNTERS on line 61 is generated by AND gate 67 in response to the concurrent appearance of the negated ASTC signal and an active low signal on line 68 from the output of flip-flop 69. Flip-flop 69 has its D input connected to line 70 from the output of OR gate 71. When the negated break signal on line 76 goes low (active), line 72 will be forced low. Also, at this point, line 51 is low so the signal on line 70 is low. This low is clocked through flip-flop 69 on to line 68 on the next rising edge of the negated ASBITRATE X 8 signal on line 49. This low on line 68 clears flip-flop 80 and causes the output of AND gate 78 to go low, thereby presetting flip-flop 75. Those familiar with the operation of type '74 flip-flops will realize that placing a low on both the negated preset and negated clear inputs will force both the Q and the negated Q outputs to a logic 1. The logic 1 now present on conductor 72 forces gate 71 to place a logic 1 on to line 70. Then, on the next rising edge of the clock on line 49, flip-flop 69 will clock the logic 1 on to line 68, thereby enabling AND gates 67 and 78 and flip-flop 80. Therefore, the presence of an active (low) signal on conductor 76 forces a low pulse from the output of flip-flop 69 and causes the loading of counters 50 and 56.

If the negated reset signal on conductor 77 is low (active), AND gate 78 will preset flip-flop 75. This disables gates 71 and forces a logic 1 on to conductor 70. This is then clocked by flip-flop 69 onto conductor 68, thereby enabling AND gate 67 and allowing the loading of counters 50 and 56.

Note that the other input to OR gate 71 is the ASBITRATE X 4 signal from line 51 which is used to synchronize transitions on line 68 appropriately with respect to the transitions on line 58.

When the preferred embodiment is exiting one of these conditions (reset or presence of a break signal) flip-flop 75 is then controlled by the negated SYNC OUT signal from line 37', which is the negated form of the data output signal from FIFO 16. This will generate a rising edge in response to the high to low transition in the output data indicating the presence of a start bit (or for that matter, any other 1 to 0 transition in the data output) and will clock a zero from the grounded D input of flip-flop 75 onto line 79. Therefore, when a start bit is detected, the signal path from flip-flop 75, through OR gate 71 to AND gate 67 is activated to generate the ASLOAD COUNTER signal.

Further initial condition control for the load counter signals is provided by flip-flop 80 which has an output on line 81 labeled AS START BIT DETECT ENABLE. This output selectively enables and disables start bit detection by flip-flop 75. Start bit detection is inhibited by a low signal on line 68, which is connected to the negated direct clear input of flip-flop 80, and is likewise assured during an active reset condition from line 77. Thus, start bit detection is disabled once a start bit has been detected and the signal passed on through to line 68. Flip-flop 80 remains in this condition until the next time a low to high transition of the ASTC signal occurs on line 22, which signal is provided on line 82 to the clock input of flip-flop 80, thus clocking a 1 into the flip-flop. Thus, the provision of the asynchronous terminal count signal re-enables start bit detection preparing the apparatus to detect the next start bit. This prevents erroneous start bit detection and inappropriate parallel loading of the counters in response to 1 to 0 transitions in the data in the middle of a character.

From the foregoing, it will be appreciated that all of the elements within dashed line 85 constitute start bit detection apparatus for controlling the parallel loading of the character counter divider chain consisting of counters 50 and 56. This apparatus is also responsive to externally applied reset signals and detection of a break condition as indicated by the negated BREAK on line 76. The negated BREAK signal is generated by NAND gate 152. The inputs to gate 152 are the ASTC signal on line 22 and the negated SYNC OUT signal on line 37'.

Negated and asserted forms of the synchronous clock signals (SYNC CLK) are provided on lines 21 and 21', respectively, as the outputs of flip-flop 86. The D input of flip-flop 86 is connected to line 57 and carries the ASBITRATE signal from counter 50. Flip-flop 86 is toggled by a 1.2288 megaHertz signal on line 87. The SYNC CLK signals are the critical bit timing signals for the transmitted data stream which is the output of the preferred embodiment. From inspection of FIG. 2, it will be appreciated that this signal is precise since it is under the control of precision crystal oscillator 40. It is at the current bit rate of the machine because its input is derived from the ASBITRATE signal on line 57 and it is clocked by a relatively fast clock signal on line 87 which is synchronous to the clock signal on line 48 which generates the ASBITRATE signal. Thus, it will be appreciated that the SYNC CLK signal will be approximately 180 degrees out of phase with the ASBITRATE signal. This is because the SYNC CLK signal is derived from the negated output of flip-flop 86.

The last clock signal shown on FIG. 2 is the generation of the ASYNC CLK signal on line 27 by the components comprised in the asynchronous clock generator, which is shown as surrounded by dashed line 19. The ASYNC CLK signal on line 27 is used to clock data into FIFO 16. This signal is generated in a conventional manner for clocking external data transitions into an edge triggered device. The generator comprises flip-flop 88, a transition detector 89 consisting of an exclusive OR gate and an inverter, and a type 161 counter 90. Counter 90 is clocked by the BITRATE X 16 signal on line 25 and its output is taken from its fourth stage which is connected to line 27.

It should be noted here that the type 161 counter used to embody counter 90 has an asynchronous direct clear input shown at 91. Thus, whenever the output of transition detector 89 forces line 92 to go low, the outputs of counter 90 are forced to zero, irrespective of the clock signal on line 25.

Asynchronous clock generator 19 is conventional in nature and operates as follows. A 0 to 1 transition on the fourth bit of counter 90 generates the rising edge on line 27 which is used to clock data into FIFO 16 (FIGS. 1 and 3). This condition occurs anytime counter 90 successfuly counts from 0 to 8. Since the counter is clocked at 16 times the bit rate from the signal on line 25, transitions on line 27 will take place at the center of the bit times. Transition detector 89 connected to flip-flop 88 simply serves to resynchronize the clock generator each time there is a transition in the input data. In particular, it will synchronize the data on each start bit and will likewise resynchronize the clock generator anytime a transition in the data within the character takes place. Therefore, in a conventional manner, the rising edges on line 27 will take place sufficiently close to the center of the bit times for the incoming data such that the data will be stable, and the value clocked into FIFO 16 will represent the value for that particular bit.

Turning next to FIG. 3, schematic diagrams for shift controller 17, transmit controller 18, and break detector 20 (FIG. 1) are shown. Each of these devices is shown surrounded by dashed lines bearing the same reference numeral as the block representing the device bore in FIG. 1. Thus, there is a one to one correspondence between same.

Before proceeding with the detailed description of these controllers, the structure of FIFO 16 should be mentioned. The preferred embodiment of FIFO 16 is conventional in nature. It is constructed of parallel rows of NAND gate latches, one row of which is used to indicate the presence of data in each bit position. Signals from this row are coupled by inverters to enable the other row of latches to cause the data to ripple through from the input to the last unoccupied cell in a queue beginning at the output. As noted hereinabove, the FIFO is 1 bit wide. The circuit from which same is constructed may be found at page 2–69 of Texas Instruments Bipolar Microcomputer. Components Data Book for Design Engineering (3rd Edition, Copyright 1980), ISBN 0-89512-110-7, which is hereby incorporated by reference. Construction of such FIFO memories is well known to those skilled in the art and does not require further elaboration.

Also, it should be noted that the preferred embodiment of the present invention is one which was designed to be used in a serial data communications device which is why the 1 bit width of the FIFO was selected. However, it will be readily apparent to those skilled in the art that, if needed, embodiments of the present invention could be constructed for parallel data communications devices, so long as there was some reasonable analog of the start and stop bits available to the system, by simply expanding the width of FIFO 16.

With that in mind, the operation of the shift, transmit, and break controllers of the preferred embodiment will be described. As an overview, the ultimate object of the preferred embodiment is to take data bits from input line 26, and send them out on transmit data output line 36. The entire purpose of the preferred embodiment is to eliminate timing differences between the data bit input stream on line 26 and the precise bit timing established by the SYNC CLK signal on line 21. As noted hereinabove, the preferred embodiment performs a conventional function of selective insertion and deletion of stop bits to compensate for any differences in bit timing between the data on lines 26 and 36.

Incoming data on line 26 is synchronized to the clock signals of the preferred embodiment by a conventional synchronizer 95 consisting of two cascaded D flip-flops to provide a clean edged and synchronized signal on line 26' to the input stage of FIFO 16. The flip-flops of synchronizer 95 are clocked by the 2.4576 megaHertz multiple rate clock signal from clock 15. As noted hereinabove, data from line 26' is shifted into FIFO 16 on positive transitions of the ASYNC CLK signal on line 27 derived from asynchronous clock generator 19 (FIGS. 1 and 2). Since the ASYNC CLK signal is controlled by the data input signal, FIFO 16 will fill in response to incoming data, essentially irrespective of whatever else might be happening within the preferred embodiment.

At the output end, transmit controller 18 controls the clocking of data from the FIFO output onto line 36. This is achieved under the control of flip-flop 96 which, as expected, is clocked by the SYNC CLK signal from line 21. The data input to flip-flop 96 is the SYNC OUT signal on line 37 which consists of the asserted form of the data at the output stage of FIFO 16. It should also be noted that, as described hereinabove, shifting of data out of FIFO 16 is controlled by positive edges of the signal on line 32.

At this point, it is appropriate to note the following feature of the preferred embodiment. No attempt is made to jam or stuff additional stop bits into FIFO 16 in response to an underspeed condition. It should be kept in mind that shifting data out of a FIFO does not literally mean that same is necessarily shifted to some downstream device. It simply means that the data which was present at the output is removed, and the data at the next subsequent bit of the FIFO ripples forward to the outputs. Therefore, flip-flop 96 and transmit controller 18 will shift data present at the FIFO output on line 37 out on to line 36 solely in response to the data which happens to be present on line 37 at the time of a positive transition in the SYNC CLK signal. The output on line 36 may also be controlled in response to the direct preset and clear inputs of flip-flop 96.

From this, a design philosophy for the preferred embodiment will be appreciated. FIFO 16 is allowed to fill with the data, start and stop bits from a character. The start bits and the data bits are transmitted. When the end of the character is reached the stop bit from the data will have rippled through the FIFO to line 37. In the meantime, the FIFO has been filling with bits from the next character. Therefore, the condition of the FIFO is checked with respect to bits from the subsequent character in order to determine whether to suppress transmission of the stop bit currently present at the output stage of FIFO 16, to transmitted normally, or to insert a stop bit in the data stream on line 36 and subsequently transmit the stop bit present at the FIFO output.

By adopting this approach, all manner of irregularities (within the maximum tolerance limits of the error in input bit timing) with respect to the bit times for the data clocked into the FIFO may be tolerated, and will be handled properly under the control of shift controller 17 and transmit controller 18. It is this operational feature which leads to the high stability of the present invention and its ability to tolerate jitter in the bit timing around the nominal bit time value which has been found to disrupt operation of prior art devices for selected stop bit insertion or deletion.

As noted hereinabove, in connection with the description of FIG. 1, overspeed and underspeed are detected by checking the fill condition of the FIFO at the time the stop bit from the currently transmitted character has rippled through to the output of FIFO 16. This is accomplished by checking the states of lines 30 and 31. Recall that the bit numbering convention for FIFO 16 proceeds from bit 1 at the input to bit 7 at the output. In the preferred embodiment, bit positions 2 and 4 are checked to determined overspeed or underspeed conditions. The signal on line 30 goes high whenever the bit 4 position is unoccupied, indicating an underspeed condition since, this means that 3 bits or less are currently contained in the FIFO. The bit 2 signal on line 31 goes high whenever bit 2 is occupied indicating that at least 6 bits are currently residing in the FIFO.

First, normal shifting in response to an acceptable, or non-existent error in input bit timing will be discussed. The shift out signal signal on line 32 controls the shifting of data out of the FIFO. This signal is generated by OR gate 110 shown in shift controller 17. The overspeed signal line 111 and normal shift signal on line 112 are the inputs to OR gate 110. Additionally, the negated underspeed signal on line 35 will directly clear the output of flip-flop 115 which is connected to line 112. Therefore, to examine normal operation in the absence of an overspeed or underspeed condition, it should be assumed that line 35 is high and line 111 remains low, thus leaving the shift signal on line 32 under the control of the signal on line 112.

Flip-flop 115 is clocked by the signal on line 116 which is the negated output of flip-flop 117. Flip-flop 117 is in turn clocked by the 614.4 kiloHerz multiple rate clock signal on line 118 and its D input is connected to the ASBITRATE X 2 signal from line 52. Therefore, the signal on line 116 is a negated and slightly delayed rendition of the ASBITRATE X 2 signal. The signal on line 116 will thus be of twice the frequency of the SYNC CLK signal on line 21 input to flip-flop 115 and will lag same slightly with respect to their otherwise corresponding edges.

Figure 4:
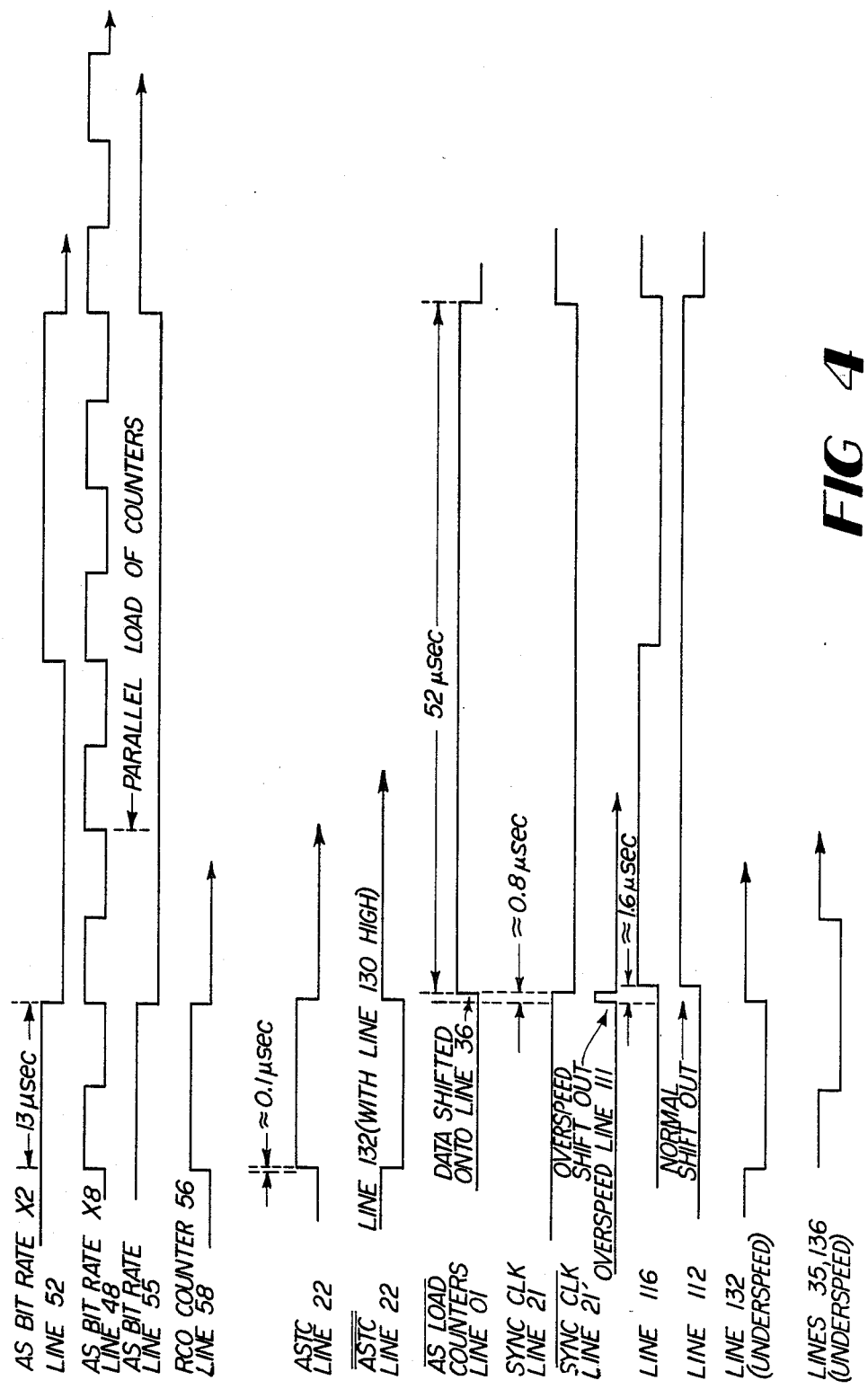
FIG. 4 is a timing diagram of certain important control signals from the shift controller of the preferred embodiment.

At this point, it is appropriate to turn to Figure 4, a timing diagram showing the relationship of certain important signals generated within shift controller 17. The foregoing description of the relationship between the SYNC CLK signal and the signal on line 116 is illustrated in Figure 4. On the left hand side of FIG. 4, the signal names, and the lines upon which they appear are illustrated. Since it is the signal on line 116 which clocks flip-flop 115 that produces the signal on line 112, the state of the SYNC CLK signal and line 116 must be checked in order to determine when transitions will take place on line 112. It should be noted that the first rising edge on line 116 illustrated in FIG. 4 occurs during a low portion of the ASBITRATE X 2 signal. The signal on line 116 is delayed by approximately 1.6 microseconds with respect to the most recent falling edge of the ASBITRATE X 2 signal.

As shown in FIG. 4, the next rising edge of the SYNC CLK signal on line 21 clocks the data on line 37 out onto line 36 as transmitted output data. This occurs approximately 0.8 microseconds after the last rising edge of the ASBITRATE X 8 signal. Approximately 800 nanoseconds later, line 116 goes high and clocks the then current state of the SYNC CLK signal (which is by then a logical 1) onto line 112. This signal passes through OR gate 110 and produces the normal shiftout rising edge on line 112 shown in FIG. 4.

It will be quickly understood from inspection of FIGS. 3 and 4 that this also describes the normal sequence of shifting bits out of FIFO 16 irrespective of whether same is a stop bit. Since the signals on lines 112 and 116 are functions only of the 614 kiloHertz multiple rate clock signal, the ASBITRATE X 2 clock signal and the SYNC CLK signal, this sequence for producing shift out pulses on line 112 occurs at the end of each bit time.

Therefore, during normal shifting in the absence of an overspeed or underspeed condition, the stop bit present on the FIFO output when the ASTC signal line goes active will be shifted out on to line 36, and subsequently shifted out of the FIFO as illustrated in FIG. 4.

It is appropriate to note here that FIG. 4 illustrates the timing of the signals when the end of a character is reached as illustrated by the ASTC signal on line 22 as illustrated in FIG. 4. It should therefore be understood that the previous rising edge of the SYNC CLK signal clocks the last data bit from the current character out on to line 36. In response to this, the stop bit rippled through to the output. The presence of the stop bit is detected by the ASTC pulse on line 22 and is conditioned to be shifted out on to line 36 by the next rising edge of the SYNC CLK signal.

Next, the operation of the preferred embodiment in overspeed and underspeed conditions will be examined. First, an overspeed condition indicated by an active state of line 31 will be considered. The output from line 31 is provided as the input to a synchronizer and deglitching circuit 119 of a type which will be familiar to those skilled in the art. Synchronizer and deglitcher circuit is clocked by the ASBITRATE X 8 signal on line 48 and consists of two cascaded D flip-flops 120 and 121 and an AND gate 122. This circuit will be very familiar to those skilled in the art and it simply serves to synchronize input data from line 31 to the clock signal provided on line 48 which is synchronous to the other clocks within the system. Deglitcher 119 is needed because significant glitch noise is commonly found on the bit loaded detector outputs of this type of FIFO circuit as bits ripple through the FIFO.

The output of synchronizer and deglitcher 119 appears on line 125 as one input to AND gate 126, the output of which is the overspeed signal on line 111. As may be seen from inspection of synchronizer and deglitcher 119, its purpose is to deglitch the occurrence of 0 to 1 transitions on line 31, with respect to its output signal on line 125.

Flip-flop 127 has an output which appears on line 128 and serves as a window generator for strobing AND gate 126 to allow it to take a look at the state of line 125 only for a short period of time under specified conditions. Thus, overspeed line 111 is only enabled to make a 0 to 1 transition to provide an additional shift out pulse on line 32 under the control of window generator 127.

Operation of the overspeed detector of shift controller 17 can be best understood by concurrent reference to FIGS. 3 and 4. Flip-flop 127 serves as a window generator for providing a short window during which AND gate 126 looks at the state of line 125 to determine if an overspeed condition is present. Since it is desired to shift out and throw away the stop bit present at the output of FIFO 16 if overspeed is detected, this window must open prior to the next rising edge in the SYNC CLK signal which would otherwise clock same out onto line 36. When the output on line 128 goes high, the window is open and allows AND gate 126 to pass the state of line 125.

Turning for a moment to FIG. 4, it should first be assumed that an overspeed condition is present and that line 125 will have settled to a logical 1 state a long time prior to the events illustrated on FIG. 4. This corresponds to the reality of what will occur in FIFO 16 during an overspeed condition. The output on line 128 is directly cleared by the negated SYNC CLK signal and has a 1 clocked out on to the line in response to positive transitions in the negated ASTC signal. Since the ASTC signal only occurs at the terminal count of the character bit counter 56 (FIG. 2) line 128 will be cleared after each stop bit is shifted out of FIFO 16 and will remain cleared until the next stop bit has rippled through and an ASTC pulse is produced.

The negated ASTC signal on line 22' is illustrated on FIG. 4. When the ASTC line goes high, this indicates to the system that the bit present at the output of the FIFO is a stop bit. This occurs approximately 13.7 microseconds before the negated SYNC CLK signal goes low at the beginning of the synchronous bit time. When the ASTC pulse terminates, a rising edge on negated ASTC is generated which clocks a 1 from the D input of flip-flop 127 onto line 128. This 1 will remain present until the negated SYNC CLK signal again goes low a few hundred nanoseconds later.

Since an overspeed condition is present and line 125 is in a logical 1 state, the overspeed signal line 111 will track the state of line 128 under these conditions. Thus, the state of line 128 is illustrated by the state of the overspeed line 111 shown on FIG. 4. Thus, lines 128 and 111 go high in response to the rising edge of the negated ASTC signal on line 22'. This shifts the then present stop bit out of FIFO 16 and into oblivion. Sufficient time is provided for the next bit to ripple to the output prior to the next rising edge of the SYNC CLK signal. On this edge, the new bit at the output of FIFO 16 is shifted out on to line 36 by transmit controller 18 and the negated SYNC CLK signal goes low, thus taking line 111 low.

This, in turn, conditions AND gate 110 to pass the normal shift pulse from line 112, which will occur in response to the next high to low transition of the ASBITRATE X 2 signal, providing for normal shift out.

From the foregoing, it will be appreciated that the overspeed pulse on line 111 meets the following necessary criteria. First, the active rising edge which shifts out the stop bit occurs prior to the next positive transition in the SYNC CLK signal which would have shifted that bit out onto line 36. Next, the overspeed pulse must terminate prior to the next occurrence of a normal shift output signal so that the start bit for the next character, which was actually transmitted on the transition of the SYNC CLK signal, will be shifted out of the FIFO in a normal fashion. Inspection of FIGS. 3 and 4 in light of the foregoing indicate that this is, in fact, how the apparatus handles overspeed conditions.

From the foregoing, it will be appreciated that window flip-flop 127 provides a window to test the condition of line 31 prior to the occurrence of the rising edge of the SYNC CLK signal which will, if no overspeed condition is present, cause the stop bit then resident at the output of FIFO 16 to be transmitted in its normal fashion. Timing of the window occurs because the negated ASTC signal is used to clock flip-flop 127 which provides the window. If the overspeed condition is present when the look is taken in the window, the stop bit is shifted out and never makes it to transmit data line 36.

Next, detection of an underspeed condition will be described. Underspeed detection is accomplished by employing a similar scheme with respect to the load status of bit position 4, as represented by the signal on line 30 from FIFO 16. The signal on line 30 is provided to a synchronization and deglitching circuit 129 which is identical to circuit 119. This synchronizer is also clocked by the ASBITRATE X 8 signal on line 48 and thus its output on line 130 indicates an active signal on line 30 indicating that there is no bit in the bit 4 position of FIFO 16.

When the ASTC signal on line 22 goes high, NAND gate 131 is enabled to pass an inversion of the signal on line 30 on to line 132 as an input to flip-flop 135. The output of flip-flop 135 appears on line 136 as an input to AND gate 137.

The purpose of the under speed signal detector is two fold. First, the detector needs to suppress the normal shift out rising edge on line 112 to prevent shifting out of the stop bit presently located at the output of FIFO 16. This is so that the bit will be held in the buffer for one more time allowing at least an additional bit to be clocked in. Furthermore, it needs to assure insertion of an additional stop bit into the data stream on line 36.

Reference to FIGS. 3 and 4 will indicate how this is accomplished. It should be assumed that line 30 has been active for a significant period of time prior to the events depicted in FIG. 4. Under these conditions, line 130 will be high and therefore line 132 will simply be an inversion of the ASTC signal on line 22. This is illustrated on FIG. 4 indicating the state of line 132 during underspeed condition. It may also be appreciated that this essentially duplicates the negated ASTC signal on line 22'. Prior to the occurrence of the ASTC pulse, line 132 has been held high, holding a logical one on line 136 which in turn holds a logical one on line 35. This is the normal operating condition of the apparatus in the absence of an underspeed condition.

Since flip-flop 135 is clocked by the negated ASBITRATE X 8 signal, the next falling edge of the ASBITRATE X 8 signal illustrated on FIG. 4, after line 132 has gone low, clocks the logical 0 on line 132 out onto line 136. This in turn is passed to line 35 through AND gate 137. The conditions of lines 35 and 136 under these circumstances are illustrated on the bottom line on FIG. 4. Line 35 is connected to the direct clear input of flip-flop 115 which provides the normal shift out output. This will hold the output on line 112 low through the period of time that it is normally clocked to produce the rising edge on line 112 illustrated as the normal shift out edge in FIG. 4.

Thus, response to an underspeed condition, line 35 holds flip-flop 115 cleared and suppresses the production of the normal shift out pulse. This holds the stop bit present at the output of FIFO 16 in the FIFO for one additional bit time, thus allowing additional bits to be clocked into the FIFO.

Line 35 also acts through OR gate 138 in transmit controller 18 to force the output of transmit flip-flop 96 high through its direct preset input. This has the effect of assuring insertion of a stop bit in the output data stream on line 36. Since, as can be seen by inspection of FIG. 4, flip-flop 96 is set to a one several microseconds prior to the normal rising edge of the SYNC CLK signal, it may be desirable to have downstream circuitry reclock the data bits on line 36 in order to assure the proper critical bit timing.

From the foregoing it will be appreciated that underspeed detection from shift controller 17 produces a pulse, the duration of which spans the normal time of occurrence of shift out rising edges on line 32 and therefore retains the stop bit present at the output of FIFO 16 in the FIFO for an additional bit time.

Break detector 20 is shown on the right hand side of FIG. 3. It is constructed using three flip-flops 145 through 147. When the reset input on line 77 is active, flip-flop 146 is set, forcing the output on line 140 low, thus enabling insertion of stop bits during reset. Otherwise, flip-flop 146 is clocked by the externally provided output on line 148 from the data terminal ready line on the serial interface to the modem. When a low to high transition takes place on data terminal ready, a 1 from the D input of flip-flop 146 is clocked out as a logic 0 on line 140 thereby enabling gate 138 to the signal on line 35. The setting of flip-flop 146 holds the direct clear input of flip-flop 145, also attached to line 140, low thus assuring clearing of the flip-flop and placing a logical 0 on line 149. This activates OR gate 150 to pass the signal present on line 151 through to its output on line 152 which controls direct clearing of flip-flop 147. Thus, the setting of flip-flop 146 latches flip-flop 145 to a zero state and it will remain in this state until a positive going transition on line 151 clocks flip-flop 145 thus setting same since its input is tied to a logical 1 condition.

The transition on line 151 will occur at the end of the concurrent presence of the ASTC signal on line 22 and a logical 1 on the negated SYNC OUT output on line 37' from the FIFO. This, will occur upon the termination of any logical 0 output from FIFO 16. However, the important point to note is that it will occur at the end of each start bit indicating the beginning of a character. This pulse passes through gate 150 to line 152 clearing flip-flop 147, thus placing a logical 1 on line 38, the negated break multiplexer signal. It will therefore be appreciated that flip-flop 147, and gate 150 serve as a break detector, the output signal from which is used to clear flip-flop 96 as well as to control certain inputs on multiplexers (not shown) appropriate to a break condition, details of which are not necessary to understand the operation of the preferred embodiment. Flip-flop 147 will remain cleared when no start bit is detected at the end of a bit time immediately following a stop bit. It will therefore be assumed that a break character is present and the apparatus will behave accordingly.

The clearing of flip-flop 96 forces a constant string of zeros out on transmit data line 36, thus passing the break condition on out on the transmitted data line 36. The next occurrence of a start bit will clear this condition, as described hereinabove. While the combination of flip-flops 145 and 146 remain latched during the break condition, line 140 is in its active high condition, thus holding line 139 high through the action of OR gate 138. This means that the STOP BIT INSERT PULSE DISABLE signal is active and prevents any insertion of stop bits in the data stream on line 36 while the break condition is maintained.

In view of the foregoing description of the preferred embodiment, it will be appreciated that the preferred embodiment overcomes the drawbacks of the prior art cited hereinabove, and meets the objects of the invention set forth earlier in this specification. Also, in view of the detailed disclosure of the preferred embodiment, other embodiments of the present invention will suggest themselves to those skilled in the art. Therefore, the scope of the present invention is to be limited only by the claims below.

I claim:

1. A data speed correction circuit for use in a data communications device of the type requiring a transmit bit stream at a predetermined bit rate plus or minus first and second tolerance values, respectively, and which is required to accept an input bit stream at said predetermined bit rate plus or minus third or fourth tolerance values, respectively, wherein said first tolerance value is less than said third tolerance value and said second tolerance value is less than said fourth tolerance value, comprising in combination:

a data input port for receiving said input bit stream;

clock means for generating an output bit clock signal for said transmit bit stream having a frequency corresponding to said predetermined bit rate plus or minus said first and said second tolerance values, and a character rate terminal count signal;

a FIFO register for accepting said input bit stream from said data input port, for providing FIFO output data signals at a FIFO output, and for shifting out said FIFO output data signals in response to a shift out signal;

said FIFO including means for detecting the presence of a data bit at a first predetermined FIFO location to provide a first FIFO bit signal and for detecting the presence of a data bit a second predetermined FIFO location to provide a second FIFO bit signal;

shift control means connected to said clock means and said FIFO for (a) providing an underspeed signal in response to an absence of said first FIFO bit signal (BIT 4) and said character rate terminal count signal;

(b) providing said shift out signal a predetermined period of time after each occurrence of a transition of a predetermined sense in said output bit clock signal in the absence of said underspeed signal;

(c) providing said shift out signal in response to said second FIFO bit signal (BIT 2) and said character rate terminal count signal; and (d) inhibiting said shift out signal from occurring upon a next said occurrence of said transition of said predetermined sense in said output bit clock signal in response to said underspeed signal; and a transmitted data control means connected to said clock means and said FIFO output for transmitting said transmit bit stream from said FIFO output in response to said transitions of a predetermined sense in said output bit clock signal and for providing and transmitting an inserted stop bit in response to said underspeed signal.

2. A data speed correction circuit for use in a data communications device of the type requiring a transmit bit stream at a predetermined bit rate plus or minus first and second tolerance values, respectively, and which is required to accept an input bit stream at said predetermined bit rate plus or minus third or fourth tolerance values, respectively, wherein said first tolerance value is less than said third tolerance value and said second tolerance value is less than said fourth tolerance value, comprising in combination:

a data input port for receiving said input bit stream;

first clock means for generating an output bit clock signal for said transmit bit stream having a frequency corresponding to said predetermined bit rate plus or minus said first and said second tolerance values, and a character rate terminal count signal and a predetermined plurality of bit rate multiple signals;

second clock means for generating an asynchronous input bit clock signal in response to said input bit stream and one of said plurality of bit rate multiple signals;

a FIFO register for accepting said input bit stream from said data input port in response to said asynchronous input bit clock signal, for providing FIFO output data signals at a FIFO output, and for shifting out said FIFO output data signals in response to a shift out signal;

said FIFO including means for detecting the presence of a data bit at a first predetermined FIFO location to provide a first FIFO bit signal and for detecting the presence of a data bit a second predetermined FIFO location to provide a second FIFO bit signal;

a transmitted data control means connected to said first clock means and said FIFO output for transmitting said transmit bit stream from said FIFO output in response to transitions of a predetermined sense in said output bit clock signal; and shift control means connected to said first clock means and said FIFO for providing said shift out signal in response to said second FIFO bit signal (BIT 2) and said character rate terminal count signal prior to a next occurrence of said transition of said predetermined sense in said output bit clock signal.

3. A data speed correction circuit as recited in claim 2 wherein:

said shift control means is responsive to an absence of said first FIFO bit signal (BIT 4) and to said character rate terminal count signal to inhibit said shift out signal from occurring upon said next occurrence of said transition of said predetermined sense in said output bit clock signal and to force said transmitted data control means to a predetermined logical output state, thereby inserting a stop bit in said output bit stream.

4. A data speed correction circuit as recited in claim 3 wherein;

said shift control means is responsive to the presence of said first FIFO bit signal (BIT 4) and to the concurrent absence of said second FIFO bit signal to provide said shift out signal in response to each of said transitions of a predetermined sense in said output bit clock signal delayed by at least one period of one of said bit rate multiple signals.

5. A data speed correction circuit as recited in claim 4 wherein:

said shift control means comprises a D flip-flop having said output bit clock signal as a data input thereto and being clocked by said one of said bit rate multiple signals.

6. A data speed correction circuit as recited in claim 3 wherein:

said shift control means tests said first FIFO bit signal on a transition of a first predetermined sense in said character rate terminal count signal and tests said second FIFO bit signal on a transition of a second predetermined sense, opposite said first predetermined sense, in said character rate terminal count signal.

* * * * *